United States Patent [19]

Taig

[11] Patent Number: 5,092,432
[45] Date of Patent: Mar. 3, 1992

[54] MECHANICAL ENERGY STORAGE FOR VEHICLE PARKING BRAKES
[75] Inventor: Alistair G. Taig, Edwardsburg, Mich.
[73] Assignee: Allied-Signal Inc., Morristown, N.J.
[21] Appl. No.: 621,504
[22] Filed: Nov. 30, 1990
[51] Int. Cl.[5] .............................. F16D 55/22
[52] U.S. Cl. ........................ 188/72.3; 188/171
[58] Field of Search ............... 188/156, 157, 162, 166, 188/171, 151, 72.2, 72.1, 72.3; 74/650, 572; 185/40 R

[56] References Cited

U.S. PATENT DOCUMENTS

| | | | |
|---|---|---|---|
| 4,532,462 | 7/1985 | Washbourn et al. | 188/162 X |
| 4,546,298 | 10/1985 | Wickham et al. | 188/162 |
| 4,944,372 | 7/1990 | Taig | 188/156 X |

Primary Examiner—Robert J. Oberleitner
Assistant Examiner—Lee W. Young
Attorney, Agent, or Firm—Larry J. Palguta; Ken C. Decker

[57] ABSTRACT

The parking brake system (10) includes a spring operated actuator (30) which includes a screw (37) having thereabout a nut (38) affixed to a laterally movable cap (32) biased by springs (34, 35) within the actuator (30). The screw (37) is connected with a gear mechanism (40) that can rotate a flywheel (60) connected selectively with an electric motor (20). The screw (37) of the spring operated actuator (30) is connected with flexible drive mechanisms (50) that are connected with brakes (18, 19) of the vehicle. The spring operated actuator (30) is in a compressed mode when the brakes (18, 19) have not been applied for parking. When the vehicle operator activates the parking brake system (10), spring expansion causes the movable cap (32) and nut (38) to move laterally which causes the screw (37) and gear mechanism (40) to rotate so that the flywheel (60) is also rotated. As the springs (34, 35) expand, the kinetic energy stored within the flywheel (60) is fed back into the parking brake system (10) to effect full application of the brakes (18, 19).

34 Claims, 4 Drawing Sheets

MECHANICAL ENERGY STORAGE FOR VEHICLE PARKING BRAKES

The present invention relates generally to a mechanical energy storage mechanism for a vehicle parking brake system, and in particular to a spring operated actuator of a parking brake system having mechanical connections between the spring operated actuator and braking mechanisms.

Spring-applied parking brake systems are in common use on medium to heavy trucks, including most air-braked vehicles. These spring brakes comprise spring packs which, when the parking brake system is applied, permit the spring to expand and apply the parking brakes. Such spring brake systems suffer from a fundamental shortcoming in that when the parking brakes are applied, the highly preloaded spring extends until the increasing brake load equals the spring load. This balance occurs when the spring is partially extended so that its available force is reduced. In order to release the parking brake, sufficient energy is required to fully compress the spring.

An electrically actuated braking system has been proposed in U.S. Pat. No. 4,944,372 owned by the same assignee as herein. This electrically actuated braking system proposed the use of a switch operated controller which activated or deactivated an electric motor that operates a load-equalizing differential operating flexible drive connections connected with brakes of the parking system. It would be highly desirable to reduce significantly the size of any electric motor utilized with a parking brake system, to decrease the size of the spring of any storage pack utilized, and to recover most of the available spring energy. The present invention provides solutions to the above problems by providing for the conversion of surplus spring energy to kinetic energy in a flywheel in order to control the rate at which the spring expands and enable the flywheel energy to be extracted when the torque or force required by the brakes exceeds that available from the spring. The present invention provides a spring and flywheel actuator assembly which would be utilized in a brake system having flexible rotating shafts driving the parking brake mechanisms.

The present invention provides solutions to the above problems by providing a spring actuated braking system, comprising a spring operated actuator connected with motor means via flywheel means and with drive connection means, the drive connection means connected with at least one brake member, and the spring operated actuator comprising spring means which is compressed when the braking system is in a non-applied mode, release of the spring means during an application of the braking system resulting in the spring operated actuator effecting rotation of the flywheel means so that as the spring means expands kinetic energy transmitted to the flywheel means is subsequently applied to the spring operated actuator, drive connection means, and brake member during operation thereof.

One way of carrying out the invention is described in detail below with reference to the drawings which illustrates an embodiment in which.

Figure 1:
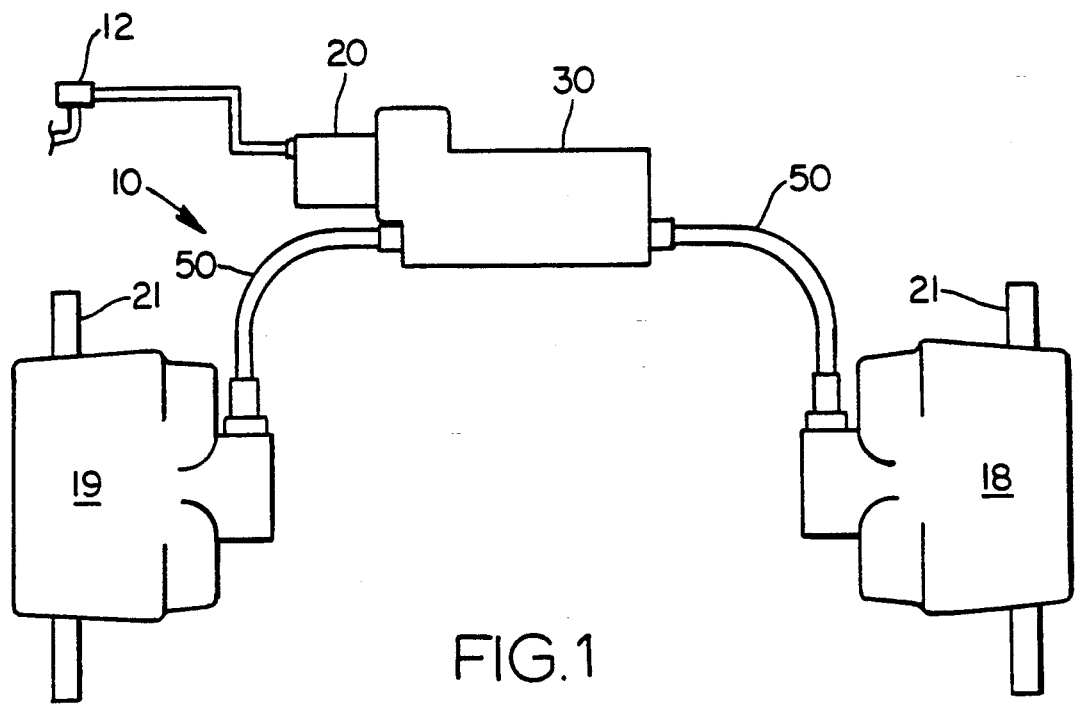
FIG. 1 is a schematic illustration of the braking system of the present invention.
Figure 3:
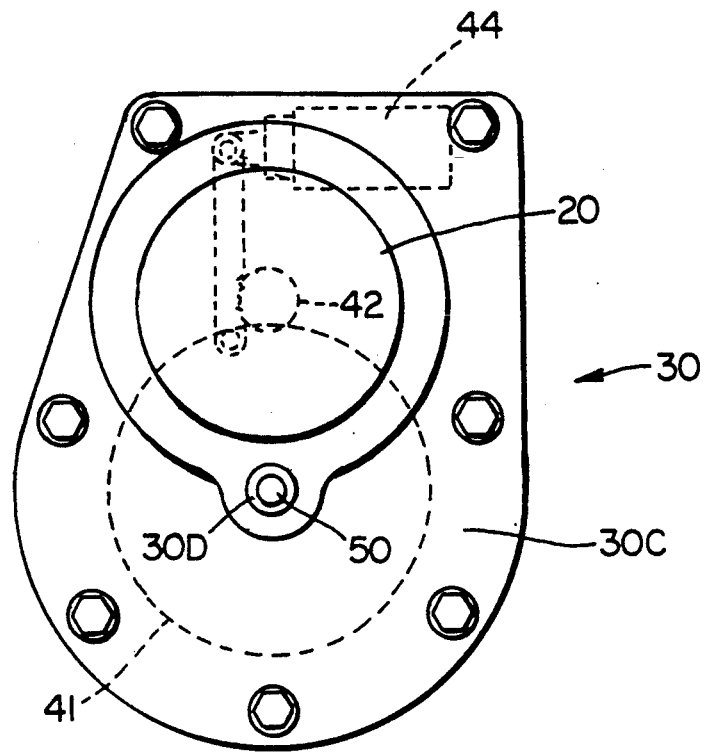
FIG. 3 is an end view taken along view line 3—3 of FIG. 2.
Figure 4:
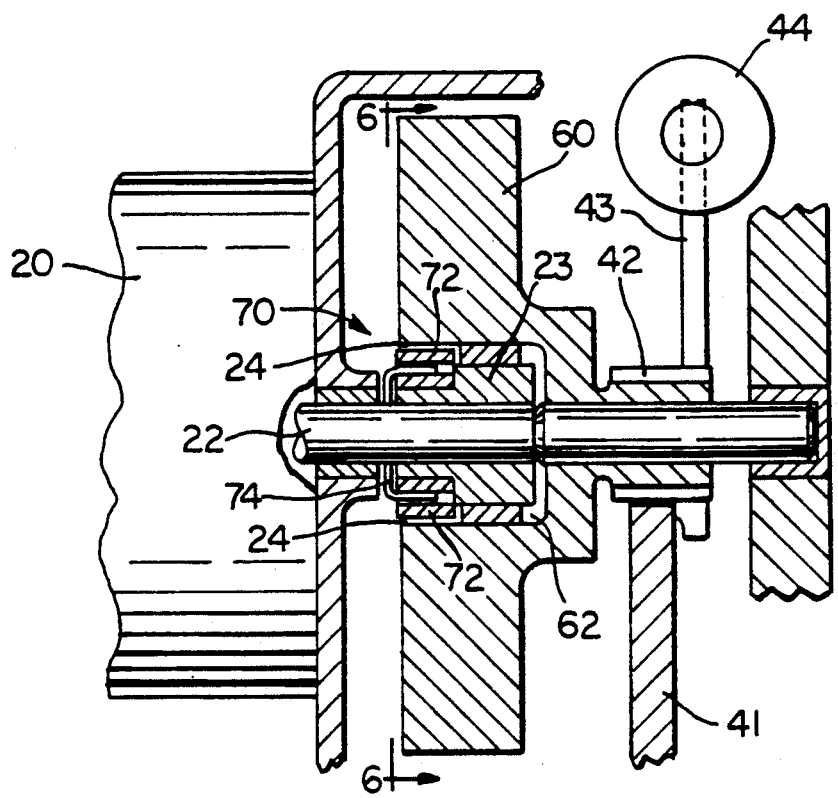
FIG. 4 is an enlargement of a portion of FIG. 2.

The spring operated actuator and parking brake system of the present invention is indicated generally by reference numeral 10 in FIG. 1. A parking switch 12 is connected with a battery (not shown) and with an electric motor 20 and solenoid (see FIGS. 1, 3 and 4) connected with a spring operated actuator 30. Spring operated actuator 30 operates flexible drive connections 50 which are connected with disc brakes 18, 19, as disclosed in U.S. Pat. No. 4,944,372 incorporated by reference herein. Each disc brake can engage an associated rotor 21 in order to effect braking of the vehicle (not shown). Disc brakes 18 and 19 have internal adjuster mechanisms for adjusting brake pad clearance as is well known in the art. Electric motor 20 is utilized to release, by means of spring operated actuator 30 and flexible drive connections 50, disc brakes 18, 19 from a parking brake application.

Figure 2:
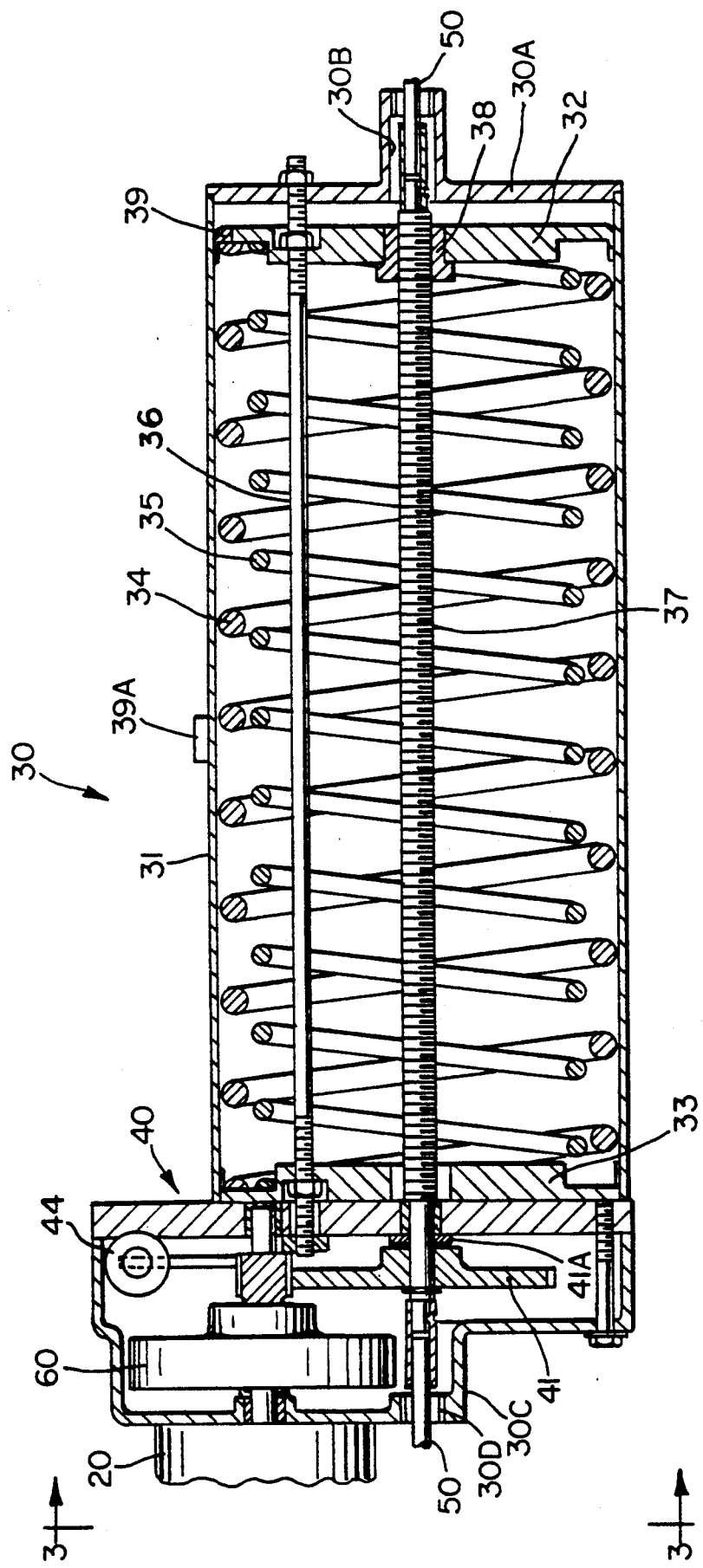
FIG. 2 is a section view of the spring operated actuator, gear means, flywheel means, and electric motor of the braking system.

FIG. 2 illustrates a section view of the spring operated actuator 30, gear means 40, flywheel means 60, and electric motor 20. Spring operated actuator 30 includes a housing 31 which encases a first laterally movable end cap 32, a second stationary end cap 33, first spring 34, second coaxial spring 35, and a plurality of tension rods 36. There may be three or more tension rods 36 which are received within appropriate sized openings in the end caps 32, 33. Housing end 30A includes an opening 30B for one flexible connection 50 which engages screw means 37. First laterally movable end cap 32 is fixedly attached to nut 38 threaded on screw means 37. Housing end 30C includes opening 30D for the other flexible connection 50 which is connected with the opposite end of screw means 37. Screw means 37 is connected with drive gear 41 of gear means 40. Drive gear 41 engages gear 42 which is integral with flywheel means 60 (see FIG. 4). Flywheel means 60 is connected by way of clutch means 70 (see FIGS. 4 and 6) with drive shaft 22 of motor 20. Clutch means 70 includes a pair of rollers 72 connected by spring 74 which positions rollers 72 within recesses 24 of drive shaft extension 23. Flywheel means 60 includes axial recess 62 which receives shaft extension 23 and clutch means 70. When the drive shaft 22 of motor 20 rotates, rollers 72 expand radially outwardly to engage recess 62 and cause flywheel means 60 to rotate. Gear 42 is engaged by latch lever 43 operated by low current applied solenoid means 44. Electric solenoid means 44 is operatively connected with switch 12 so that, when the parking brake system is in the non-apply mode, latch lever 43 and tooth 45 in FIG. 5 engage the teeth of gear 42 to immobilize gear 42, drive gear 41, and screw means 37. In other words, when springs 34 and 35 have been compressed by movable end cap 32, latch lever 43 is utilized to lock in place the system and retain springs 34 and 35 in a compressed state.

The operation of parking brake system 10 will now be explained in detail. FIG. 2 illustrates spring operated actuator 30 in the fully released or parking brake actuated position. In order to release the applied parking brake system, the vehicle operator will actuate switch 12 which causes electric motor 20 to operate such that clutch means 70 engages and rotates flywheel means 60. Rotation of flywheel means 60 effects via gear means 40 the rotation of screw means 37 which causes nut 38 to translate toward the left in FIG. 2. The translation on nut 38 causes end cap 32 to move therewith and effect compression of springs 34 and 35. End cap 32 includes magnet 39 which will operate magnetic switch 39A located at housing 30 and connected with motor 20 and solenoid means 44. Operation of magnetic switch 39A will cause motor 20 to cease operation, and simultaneously therewith solenoid means 44 operates to move the latch lever in the direction of arrow A in FIG. 5. Latch lever 43 engages gear 42 so that gear 42, drive gear 41, screw means 37, cap 32, and springs 34, 35 are immobilized. Thus, while the vehicle is being operated, spring operated actuator 30 is in a compressed mode and ready for an application of the parking brakes when the vehicle operator so chooses.

Figure 7:
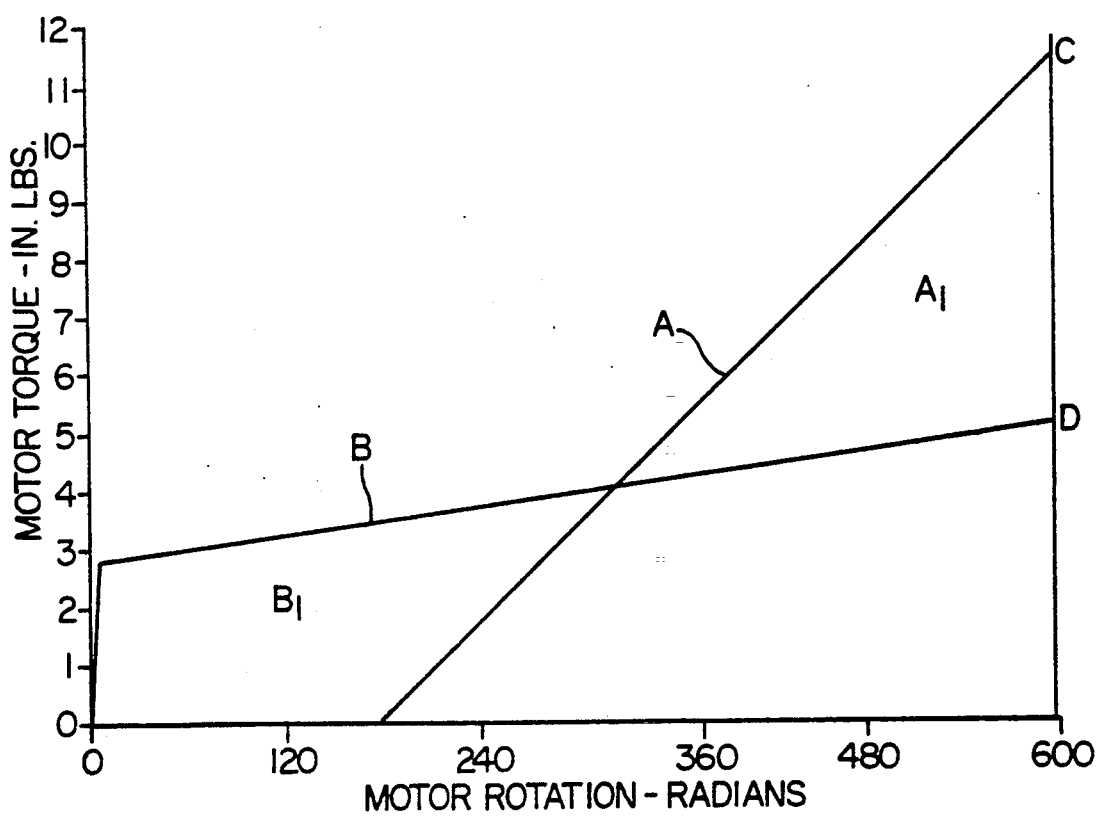
FIG. 7 is a graphic illustration of the forces required to operate a parking brake system with and without a flywheel.
Figure 5:
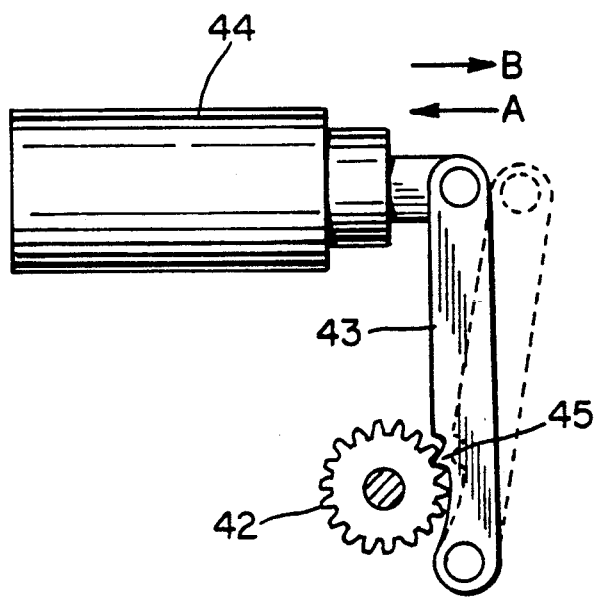
FIG. 5 is an illustration of the latching mechanism.
Figure 6:
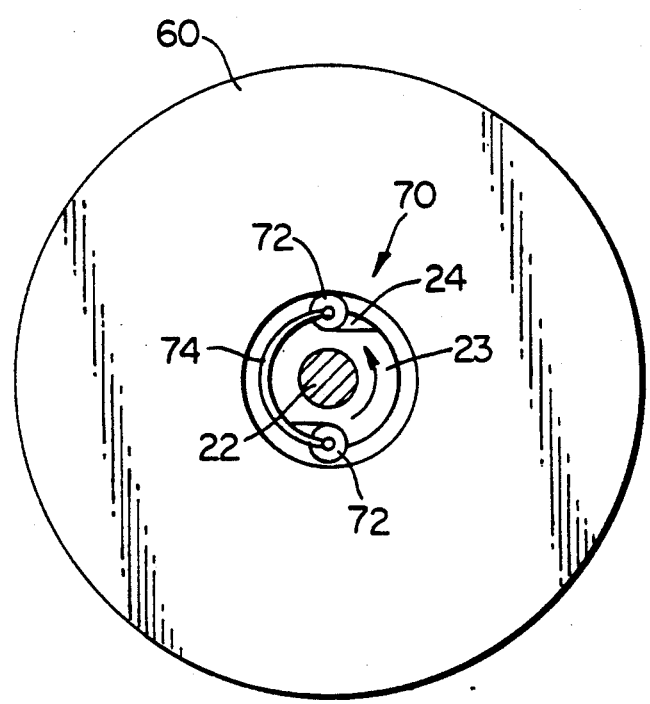
FIG. 6 is a view taken along view line 6—6 of FIG. 4.

When the vehicle operator chooses to apply the parking brakes, he moves switch 12 into an opposite position which denergizes the low current applied solenoid means 44 whereby an internal spring (not shown) in solenoid 44 causes latch lever 43 to move in the direction of arrow B in FIG. 5. This releases for rotation gear 42, flywheel means 60, drive gear 41 and screw means 37. As springs 34, 35 expand and cause end cap 32 to move laterally towards the right in FIG. 2, nut 38 causes screw means 37 to rotate, and likewise rotates drive gear 41 and gear 42 so that the flywheel means is rotated. This stores kinetic energy within flywheel means 60 so that as the brakes 18, 19, via rotating flexible connections 50, are applied to engage rotors 21, the flywheel means then feeds back into braking system 10 (via rotation gear 42, drive gear 41, screw means 37, and flexible connections 50) the stored kinetic energy. Thus, surplus spring energy is converted to kinetic energy initially in the flywheel means in order to control the rate at which the springs expand and then, subsequently, the flywheel means kinetic energy is extracted and fed back into the braking system when the torque or force required by brakes 18, 19 exceeds that available from springs 34, 35. This is illustrated graphically in FIG. 7 wherein Curve A represents the amount of torque required for a spring pack operated braking system to be operated without the use of the flywheel means. Likewise, the amount of motor torque C by the electric motor must be sufficient to release the parking brake mechanism when the brakes are to be released. Curve B illustrates the amount of torque required when the parking brake system utilizes the present invention wherein a flywheel means is utilized. The energy $A_1$ under Curve A and above Curve B represents approximately the amount of energy $B_1$ under Curve B and above Curve A which is stored by the flywheel means and then fed back into the system. The primary result is that the spring force required to operate the parking brakes is approximately halved when the flywheel means is added to the system, as shown by points C and D in FIG. 7. The energy stored by the spring operated actuator is also about half that of an unassisted spring operated actuator resulting in the motor torque required of the electric motor for brake release being approximately halved at point D as compared to the motor torque required at point C for the release of an unassisted spring pack operated parking brake system which doesn't have flywheel means. Thus, the motor output requirements have been essentially halved which enables the utilization of a smaller motor in the system. Additionally, the reduced energy stored is more easily contained if an accidental spring release occurs.

Spring operated actuator 30 may be connected with either the flexible drive connections 50 or the connections 50 may be replaced by cables or rods that are connected directly with cap 32 to effect a direct pull of a cable in order to operate such a braking system.

An advantage of the present invention is that springs 34, 35 are held in a preloaded state between end caps 32, 33, during assembly or for overhaul, by the plurality of tension rods 36. Thus, springs 34, 35, ends caps 32, 33 and rods 36 comprise a pre-assembled package, and housing 30 is not required to carry any load. End cap 33 reacts the spring force and the equal but opposite thrust from screw means 37, via thrust bearings 41A.

The present invention provides substantial advantages over prior spring operated braking systems in that some of the spring energy is temporarily stored in flywheel means and then recovered during the parking brake application. This recovery of the spring energy allows the use of smaller springs, and the energy needed to compress the springs to release the brakes is correspondingly reduced. Because the springs during expansion must cause rotation of screw means 37, gear means 40 and flywheel means 60, the release of spring energy is slowed down and this results in a safer, controlled parking brake application. Finally, the preassembled, preloaded spring package would be safer and more easily handled than a conventional spring pack.

I claim:

1. A spring actuated braking system, comprising a spring operated actuator connected with a motor means via a flywheel and with a drive connection means, the drive connection means connected with at least one brake member, and the spring operated actuator comprising a spring means which is compressed when the braking system is in a non-applied mode, release of the spring means during an application of the braking system resulting in the spring operated actuator effecting rotation of the flywheel and operation of the drive connection means so that as the spring means expands and the expansion force thereof diminishes, kinetic energy transmitted previously to the flywheel is applied increasingly to the spring operated actuator, drive connection means, and brake member during operation thereof.

2. The system in accordance with claim 1, wherein the drive connection means comprises a flexible drive connection means.

3. The system in accordance with claim 1, wherein the spring operated actuator includes a screw means connected with a gear means operatively connected with said flywheel.

4. The system in accordance with claim 3, wherein the spring operated actuator includes oppositely disposed caps one of which receives fixedly a nut means positioned about said screw means.

5. The system in accordance with claim 4, wherein said nut means includes threads engaging threads of the screw means so that said one cap moves with said nut means along said screw means.

6. The system in accordance with claim 5, wherein the actuator means includes a solenoid means connected with latching means that engages said gear means.

7. The system in accordance with claim 6, wherein said one cap includes a magnet means and said actuator includes a magnetic switch means connected with said solenoid means.

8. The system in accordance with claim 7, wherein said latching means engages said gear means to retain said spring means in compression.

9. The system in accordance with claim 1, wherein said motor means comprises an electric motor means.

10. The system in accordance with claim 1, wherein said spring operated actuator includes a rod means which limits extension of said spring means.

11. The system in accordance with claim 1, wherein said spring means comprises two springs, one spring disposed coaxially about the other spring.

12. The system in accordance with claim 1 wherein the motor means is connected with said flywheel by way of an inertial clutch.

13. The system in accordance with claim 12, wherein said inertial clutch comprises spring biased rollers disposed about a drive shaft of said motor means and located within a central recess of the flywheel.

14. The system in accordance with claim 13, wherein said inertial clutch, upon rotation of said drive shaft by said motor means, expands said rollers radially outwardly to engage said flywheel and cause rotation thereof.

15. A spring actuated braking system, comprising a spring operated actuator connected with motor means via a flywheel, the spring operated actuator means being connected with a drive connection means, the drive connection means connected with at least one brake member, the spring operated actuator comprising a spring means which is compressed when the braking system is in a non-applied mode, the spring means operatively connected with screw means connected with gear means operatively connected with said flywheel, and release of the spring means during an application of the braking system resulting in the spring operated actuator effecting rotation of the flywheel and operation of the drive connection means so that, when the spring means expands and the expansion force thereof diminishes, kinetic energy transmitted previously to the flywheel is applied increasingly to the spring operated actuator, drive connection means, and brake member during operation thereof.

16. The system in accordance with claim 15, wherein said spring operated actuator includes oppositely disposed caps one of which receives fixedly a nut means engaging said screw means.

17. The system in accordance with claim 16, wherein the actuator includes a solenoid means connected with latching means that engages said gear means.

18. The system in accordance with claim 17, wherein said latching means engages said gear means to retain said spring means in compression.

19. The system in accordance with claim 18, wherein said one cap includes a magnet means and said actuator includes a magnetic switch means connected with said solenoid means.

20. The system in accordance with claim 15, wherein said spring operated actuator includes a rod means which limits extension of said spring means.

21. The system in accordance with claim 15, wherein said spring means comprises two springs, one spring disposed coaxially about the other spring.

22. The system in accordance with claim 15, wherein the motor means is connected with said flywheel by way of an inertial clutch.

23. The system in accordance with claim 22, wherein said inertial clutch comprises spring biased rollers disposed about a drive shaft of said motor means and located within a central recess of the flywheel.

24. The system in accordance with claim 23, wherein said inertial clutch, upon rotation of said drive shaft by said motor means, expands said rollers radially outwardly to engage said flywheel and cause rotation thereof.

25. A spring operated actuator, comprising a motor means connected with the actuator via a flywheel, a spring means which is compressed when the actuator is in a non-applied mode, the spring means operatively connected with a screw means connected with a gear means operatively connected with said flywheel, release of the spring means during an application of the actuator resulting in the spring operated actuator effecting rotation of the flywheel and operation of the screw means so that, when the spring means expands and the expansion force thereof diminishes, kinetic energy transmitted previously to the flywheel is applied increasingly to the screw means of the spring operated actuator.

26. The actuator in accordance with claim 25, wherein said spring operated actuator includes oppositely disposed caps one of which receives fixedly a nut means engaging said screw means.

27. The actuator in accordance with claim 26, wherein the actuator includes a solenoid means connected with a latching means that engages said gear means.

28. The actuator in accordance with claim 27, wherein said latching means engages said gear means to retain said spring means in compression.

29. The actuator in accordance with claim 28, wherein said one cap includes a magnet means and said actuator includes a magnetic switch means connected with said solenoid means.

30. The actuator in accordance with claim 25, wherein said spring operated actuator includes a rod means which limits extension of said spring means.

31. The actuator in accordance with claim 25, wherein said spring means comprises two springs, one spring disposed coaxially about the other spring.

32. The actuator in accordance with claim 25, wherein the motor means is connected with said flywheel by way of an inertial clutch.

33. The actuator in accordance with claim 32, wherein said inertial clutch comprises spring biased rollers disposed about a drive shaft of said motor means and located within a central recess of the flywheel.

34. The actuator in accordance with claim 33, wherein said inertial clutch, upon rotation of said drive shaft by said motor means, expands said rollers radially outwardly to engage said flywheel and cause rotation thereof.

* * * * *